United States Patent [19]

Bourland

[11] Patent Number: 4,501,848

[45] Date of Patent: Feb. 26, 1985

[54] VINYLIDENE CHLORIDE COPOLYMER-BASED MOLDING COMPOUND

[75] Inventor: Larry G. Bourland, Downingtown, Pa.

[73] Assignee: Atlantic Richfield Company, Los Angeles, Calif.

[21] Appl. No.: 613,844

[22] Filed: May 24, 1984

[51] Int. Cl.³ .................. C08L 27/08; C08L 23/16; C08L 23/12; C08L 23/26
[52] U.S. Cl. .................. 524/527; 525/239; 525/194; 525/227; 525/235; 525/238
[58] Field of Search .............. 525/239, 194, 227, 238, 525/235; 524/527

[56] References Cited

U.S. PATENT DOCUMENTS

| | | | |
|---|---|---|---|
| 3,046,237 | 7/1962 | Rosenfelder et al. | 525/239 |
| 3,058,943 | 10/1962 | Gray et al. | 525/239 |
| 3,075,946 | 1/1963 | Zupic | 525/239 |
| 3,085,082 | 4/1963 | Baer et al. | 525/239 |
| 3,144,436 | 8/1964 | Greene et al. | 525/387 |
| 3,303,148 | 2/1967 | Joyner et al. | 525/222 |
| 3,390,208 | 6/1968 | Montgomery | 525/239 |
| 3,607,986 | 9/1971 | Ager et al. | 525/239 |

Primary Examiner—Carman J. Seccuro
Attorney, Agent, or Firm—Dennis M. Kozak

[57] ABSTRACT

The incorporation of a high melt flow rate propylene-based polymer additive into a vinylidene chloride copolymer-based molding compound serves to retard the fusion rate of the resulting compound during processing.

14 Claims, No Drawings

VINYLIDENE CHLORIDE COPOLYMER-BASED MOLDING COMPOUND

This invention pertains to additives for vinylidene chloride (VDC) copolymer-based plastics.

In one of its more specific aspects, this invention relates to the incorporation of a high melt flow rate propylene-based polymer additive into a VDC copolymer-based molding compound for the purpose of retarding the fusion rate of the compound during processing.

Much work has been done in the field of copolymerization of vinylidene chloride with other monomers to obtain useful plastics. It is now well established that the addition of a relatively small amount of comonomer to a VDC copolymer retains the most valuable quality of high crystallinity from polyvinylidene chloride and also improves the mechanical process capability and solubility of the copolymer. Hence, molding compounds comprising VDC copolymers are well known. Generally, these compounds are prepared by adding to a base VDC copolymer resin one or more components that will allow it to be processed into a finished product with desired properties and at minimum costs.

Notwithstanding, VDC copolymers have relatively high melt viscosities at typical processing temperatures. The processing consequences of this high melt viscosity are: (1) high mechanical energy is required for extruder screw rotation and material transport in the molten state, and (2) excessive frictional heat develops from the shear applied during processing and elevates the stock temperature which in turn causes serious thermal stability problems including resin degradation.

Thus, in the compounding of VDC copolymer molding compositions, lubricating additives and/or plasticizers are required to retard the fusion rate of the VDC copolymer composition and, hence, control the frictional heat buildup resulting from conventional processing techniques such as extrusion, milling, calendering and injection molding, all of which involve the application of shear to promote fusion, melt homogeneity and flow. It has not, however, been the practice to incorporate a high melt flow rate propylene-based polymer additive to effect such processing improvements.

This invention provides a novel VDC copolymer compound which incorporates a high melt flow rate propylene-based polymer additive for the purpose of improving mechanical process capability by retarding the fusion characteristics of the VDC copolymer compound.

As used herein, the term "high melt flow rate" means a melt flow rate equal to or greater than 300 grams/10 minutes measured using A.S.T.M. D-1238-78, Condition L. All melt flow rates herein were determined using this test method.

According to this invention there is provided a moldable compound comprising: (a) a vinylidene chloride copolymer resin and (b) a high melt flow rate propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl.

According to this invention, there is also provided a method of producing a molded compound which comprises forming a moldable compound comprising a vinylidene chloride copolymer resin and a high melt flow rate propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, and molding the resulting moldable compound.

Also, according to this invention, there is provided a method of retarding the fusion rate of a vinylidene chloride-based copolymer molding compound comprising a vinylidene chloride copolymer resin which method comprises incorporating into the vinylidene chloride copolymer-based molding compound a high melt flow rate propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, the high melt flow rate propylene-based polymer being employed in an amount sufficient to retard the fusion rate of the molding compound upon processing.

In a preferred embodiment, the high melt flow rate propylene-based polymer additive is a high melt flow rate polypropylene.

In another preferred embodiment, the high melt flow rate propylene-based polymer additive is a high melt flow rate propylene-ethylene copolymer.

In another preferred embodiment, the high melt flow rate propylene-based polymer additive has a melt flow rate equal to or greater than 900 g/10 min.

In another preferred embodiment, the VDC copolymer is a vinylidene chloride/vinyl chloride copolymer.

The moldable VDC copolymer composition of this invention will be comprised, preferably, of the following components:

(a) 100 parts of a vinylidene chloride copolymer base resin;

(b) up to about 5 phr of stabilizer;

(c) from about 0.1 to about 10, preferably 0.5 to about 5 phr of the high melt flow rate propylene-based polymer additive; and (d) up to about 3 phr of plasticizer.

The vinylidene chloride copolymer base resins which can be used in the practice of this invention are well known in the art and selected based on specific application. The VDC copolymer resin can be a copolymer or a terpolymer of recurring units of vinylidene chloride and at least one polymerizable comonomer selected from the group consisting of vinyl chloride, acrylic and methacrylic acid esters, acrylonitrile, butadiene and the like. Examples of suitable VDC copolymers are vinylidene chloride/vinyl chloride; vinylidene chloride/methyl acrylate, vinylidene chloride/acrylonitrile, vinylidene chloride/methyl methacryliate, vinylidene chloride/butyl acrylate and the like. The VDC copolymer resin can be produced by either suspension or emulsion polymerization and will contain from about 55 to about 99 mole %, preferably from about 75 to about 95 mole % of recurring units of vinylidene chloride.

Reference is made to The Dow Chemical Company product bulletin entitled Saran Resins in Extrusion, Molding and Powder Applications © 1979, Form No. 190-289-79; U.S. Pat. No. 3,642,743 related to suspension polymerization of VDC copolymers; U.S. Pat. No. 3,291,769 related to emulsion polymerization of VDC copolymer; and Ham, G. E. ed. "Copolymerization" Chap. X Interscience, New York, 1964 587-637, the teachings of which are incorporated herein by reference thereto.

Vinylidene chloride/vinyl chloride copolymers suitable for use in this invention are commercially available from The Dow Chemical Company and are designated Saran ® resins.

To inhibit degradation various stabilizers can be added to the VDC copolymer molding compositions. Suitable heat stabilizers include tetrasodium pyrophosphate and epoxidized oils, e.g. soybean or linseed oils. U.S. Pat. No. 3,882,081 teaches a process for stabilizing VDC copolymers against metal induced degradation using a combination of a dibasic lead phosphite and 1,4 benzoquinone.

The high melt flow rate propylene-based polymer additive which is employed in this invention exhibits Newtonian flow characteristics and is an isotatic, crystalline propylene homopolymer or copolymer as previously defined. It will have a peak molecular weight of from about 15,000 to about 60,000. Suitable propylene-based polymers are prepared by the degradation of higher molecular weight propylene-based polymers and are commercially available. U.S. Pat. No. 3,144,436 teaches a method for degrading steroregular polymers and is incorporated herein by reference thereto. The high melt flow rate propylene-based polymer will have a melt flow rate equal to or greater than 300 g/10 mins., preferably equal to or greater than 900 g/10 mins.

Particularly suitable for use in this invention are the high melt flow rate propylene-based polymers designated Arvis ™ resins, available from ARCO Chemical Company, division of Atlantic Richfield Company.

Arvis ™ 1000 resin is a visbroken propylene homopolymer having a peak molecular weight of 47,000, a melt flow rate of 1600 g/10 min. and a melting point as determined by differential scanning calorimetry (DSC) of about 165° C.

Arvis ™ 3000 resin is a visbroken 2.5 wt.% ethylene/propylene copolymer having a peak molecular weight of 42,000, a melt flow rate of 1800 g/10 min. and a melting point by DSC of about 148° C.

Arvis ™ 5000 resin is a visbroken 4.5 wt. % ethylene/propylene copolymer having a peak molecular weight of 48,000, and a melting point by DSC of about 132° C.

Plasticizers are such as are conventionally employed and include ester plasticizers such as butylene adipate, poly(hexamethylene sebecate), and the like. (See M. Aubin et al., J. Polym. Sci. Polym. Phys. Ed. 21, 233 (1983); and M. Aubin et al., Polym. Eng. and Sci. 24(5), 350 (1984) both articles are incorporated herein by reference.)

Optionally, for certain specific applications, the VDC compound can be formulated to also include various antioxidants, processing aids, impact modifiers, pigments, fillers, antistatic agents, reodorants, dulling or flattening agents and the like.

The invention is demonstrated by the following examples.

EXAMPLES 1-4

A series of four (4) VDC copolymer molding compounds was prepared by intensive dry mixing, individually, the ingredients set forth in Table I.

TABLE I

| Ingredient | Example No. | | | |
|---|---|---|---|---|
| | 1 (control) | 2 | 3 | 4 |
| vinylidene chloride copolymer resin[1] | 100 | 100 | 100 | 100 |
| HMFR additive[2] | 0 | 1.0 | 2.0 | 3.0 |

[1]Saran 925 resin (vinylidene chloride/vinyl chloride copolymer); contains no plasticizer or stabilizers; Resin Properties:
specific gravity, g/cm$^3$ (ASTM D792) = 1.65
melting range, °C. = 135-145
maximum temperature for melt extrusion, °C. = 175
[2]HMFR = high melt flow rate; Arvis 3000 resin (ARCO Chemical Company, Division of Atlantic Richfield Company)
Compositions in parts per 100 parts of VDC resin (phr)

Brabender fusion data for the four VDC copolymer molding compounds (Examples 1-4) were obtained by separately introducing an 83.6 gram charge of each of the four compounds into a Brabender mixing bowl equipped with No. 6 roller blades and mixing at 170° C. and 64 rpm. Table II shows the resulting Brabender fusion data.

TABLE II

| Compound of Example No. | Fusion Time* (Minutes) | Ultimate Torque (M-g) |
|---|---|---|
| 1 (control) | Fused Instantly | Degraded |
| 2 | 1.0 | 1,200 |
| 3 | 0.9 | 1,000 |
| 4 | 1.0 | 750 |

*time required to reach maximum torque

EXAMPLES 5-8

A series of four (4) VDC molding compounds was prepared by intensive dry mixing individually the ingredients set forth in Table III.

TABLE III

| Ingredient | Example No. | | | |
|---|---|---|---|---|
| | 7 (control) | 8 | 9 | 10 |
| vinylidene chloride copolymer resin[1] | 100 | 100 | 100 | 100 |
| HMFR additive[2] | 0 | 1.0 | 2.0 | 3.0 |

[1]Saran 864 resin (vinylidene chloride/vinyl chloride copolymer resin) contains plasticizer and stabilizers; Resin Properties:
specific gravity, g/cm$^2$ (ASTM 1505) = 1.71
Extruder Melt Temperature Range °C. = 170-190
[2]Arvis 3000 resin (ARCO Chemical Company, Division of Atlantic Richfield Company)
Compositions in parts per 100 parts of VDC resin (phr)

Brabender fusion data for the four VDC molding compounds (Examples 5-8) were obtained by separately introducing an 83.6 gram charge of each of the four compounds into a Brabender mixing bowl equipped with No. 6 rollers blades and mixing at 170° C. and 64 rpm. Table IV shows the resulting Brabender fusion data.

TABLE IV

| Compound of Example No. | Fusion Time* (Minutes) | Ultimate Torque (M-g) |
|---|---|---|
| 5 (control) | Fused Instantly | Degraded |
| 6 | 0.5 | 1,000 |
| 7 | 0.5 | 900 |
| 8 | 0.4 | 750 |

*time required to reach maximum torque

It will be evident from the foregoing that various modifications can be made to this invention. Such, however, are considered as being within the scope of the invention.

What is claimed is:

1. A molding compound comprising: (a) a vinylidene chloride copolymer resin and (b) from about 0.1 to about 10 parts per each 100 parts of vinylidene chloride copolymer resin of a high melt flow rate isotactic propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, said high melt flow rate propylene based polymer having a melt flow rate of at least 300 grams/10 minutes measured using ASTMD-1238-79 Condition L.

2. The molding compound of claim 1 in which said high melt flow rate propylene-based polymer has a melt flow rate of at least 900 grams/10 minutes measured using A.S.T.M. D-1238-79 Condition L.

3. The molding compound of claim 1 in which said high melt flow rate propylene-based polymer has a peak molecular weight of from about 15,000 to about 60,000.

4. The molding compound of claim 1 in which said high melt flow rate propylene-based polymer is a propylene homopolymer.

5. The molding compound of claim 1 in which said high melt flow rate propylene-based polymer is a propylene-ethylene copolymer.

6. The molding compound of claim 1 comprising a stabilizer.

7. The molding compound of claim 1 comprising a plasticizer.

8. The molding compound of claim 1 in which said high melt flow rate propylene-based polymer is employed in an amount within the range of from about 0.5 to about 5 parts per each 100 parts of vinylidene chloride copolymer resin.

9. The molding compound of claim 1 in which said vinylidene chloride copolymer resin is a copolymer or terpolymer of recurring units of vinylidene chloride and at least one polymerizable comonomer selected from the group consisting of vinyl chloride, acrylic and methacrylic acid esters, acrylonitrile, and butadiene.

10. The molding compound of claim 1 in which said vinylidene chloride copolymer is vinylidene chloride/vinyl chloride copolymer.

11. A method of retarding the fusion rate of a vinylidene chloride copolymer-based molding compound comprising a vinylidene chloride copolymer resin which method comprises incorporating into the vinylidene chloride copolymer-based molding compound a high melt flow rate isotactic propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, the high melt flow rate propylene-based polymer being employed in an amount from about 0.1 to about 10 parts per each 100 parts of vinylidene chloride copolymer resin so as to retard the fusion rate of the molding compound upon processing said high melt flow rate propylene based polymer having a melt flow rate of at least 300 grams/10 minutes measured using ASTMD-1238-79 Condition L.

12. A method of producing a molded compound which comprises forming a molding compound comprising a vinylidene chloride copolymer resin and from about 0.1 to about 10 parts per each 100 parts of vinylidene chloride copolymer resin of a high melt flow rate propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, and molding the resulting compound, said high melt flow rate propylene based polymer having a melt flow rate of at least 300 grams/10 minutes measured using ASTMD-1238-79 Condition L.

13. The method of claim 12 which a stabilizer is incorporated, into the molding compound.

14. The method of claim 12 in which a plasticizer into the molding compound.

* * * * *